United States Patent Office 3,347,885
Patented Oct. 17, 1967

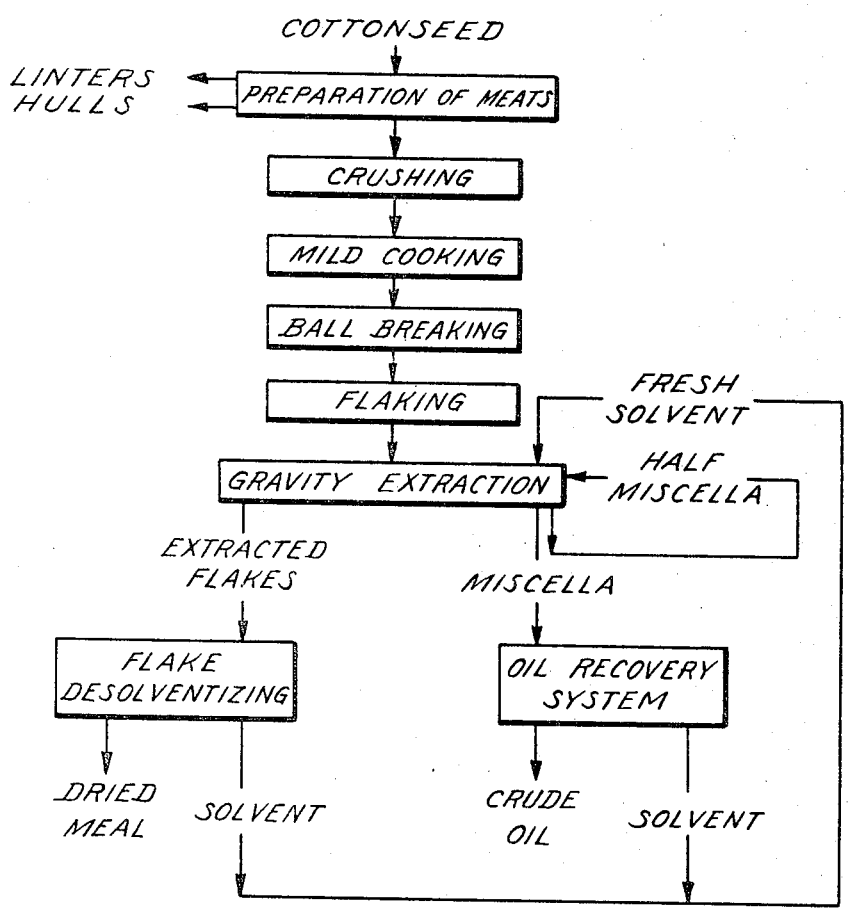

3,347,885
COTTONSEED OIL DIRECT EXTRACTION
METHOD
Odell J. Jones, Phoenix, Ariz., and Bentley H. Page and David F. Dubbs, Lubbock, Tex., assignors to Anderson, Clayton & Co., Inc., Houston, Tex., a corporation of Delaware
Filed Jan. 3, 1966, Ser. No. 518,173
5 Claims. (Cl. 260—412.4)

ABSTRACT OF THE DISCLOSURE

A method for directly extracting oil from cotton-seed by mildly cooking the meats, maintaining moisture content at an adjusted level, flaking the cooked meats, and extracting the oil therefrom by contact with a solvent in gravity percolation flow.

---

The present invention relates to an improved method for extracting oil from cottonseed and more particularly to an improved method for directly solvent extracting oil by gravity flow from mildly cooked flaked cottonseed meat particles.

The present invention is directed to a method of extracting oil from mildly cooked cottonseed meat flakes by gravity flow which is an improvement over the method disclosed by E. A. Gastrock et al. in U.S. Patent No. 2,726,253. In the past, cottonseed oil extraction processes have been governed by the type of cottonseed meal and oil desired as end products. For instance, if a meal is desired for feeding ruminant animals only, it has been the practice to directly solvent extract oil from tempered as opposed to mildly cooked cottonseed meats whereby only a portion of the free gossypol is removed as is well known in the art. On the other hand, if a cottonseed meal suitable for feeding non-ruminant as well as ruminant animals and a more stable oil are desired, it has been the practice to mildly cook crushed cottonseed meats to detoxify the gossypol while aiding in the release of the oil from the cooked meat particles. In the method described in the cited U.S. Patent No. 2,726,253, the mild cooking process was improved by eliminating cumbersome and costly pre-pressing steps and at the same time minimizing the "fines problem." However, the method in the cited patent has been restricted to a slurrying and filtration method of solvent extracting the cooked meat particles which requires bulky and expensive slurrying vessels and complex filtration apparatus.

It would be advantageous to provide a method for directly solvent extracting cooked cottonseed meat particles by gravity flow or percolation extraction means which overcomes the disadvantages inherent in filtration extraction while at the same time eliminating the necessity of pre-pressing mildly cooked cottonseed particles. The present invention is directed to such a method wherein moisture content, temperature, and flake size of the cottonseed meat are critical parameters in attaining the surprising results of the invention.

It is therefore an object of the present invention to provide an improved method for directly extracting oil from mildly cooked cottonseed meat by gravity flow solvent means.

Another object of the present invention is to provide an improved method for solvent extracting oil from mildly cooked cottonseed meat particles by gravity flow extraction wherein stable oil and low free-gossypol meal are obtained.

A further object of the present invention is to provide an improved method for solvent extracting oil from mildly cooked cottonseed meat particles by gravity flow extraction wherein there is efficient separation of oil from the meat particles without the necessity of pre-pressing such meat particles after cooking and without the necessity of slurrying and filtering such particles.

Still another object of the present invention is to provide an improved method for solvent extracting oil from cottonseed by mildly cooking the cottonseed meat flakes, forming the meat into flakes, and extracting the oil from such compressed meat flakes by contact with an oilseed extraction solvent in gravity flow.

Other and further objects, features and advantages will be apparent from the following description of a presently preferred embodiment of the invention, given for the purpose of disclosure, and taken in conjunction with the accompanying drawing where:

FIGURE 1 is a flow diagram of the improved method of the present invention.

The present invention generally provides an improved method for directly extracting oil from cottonseed meat by gravity flow extraction whereby the necessity of pre-pressing cooked meat particles is obviated while at the same time efficient separation of oil from the cottonseed meat particles is effected without the necessity of slurrying and filtering by vacuum filtration means. Adherence to critical ranges of meat moisture content and temperature while cooking and flake size for gravity extraction is necessary to carry out the present invention and to obtain the unique results of the improvement herein.

It is well known in the processing of cottonseed that after decortication, the cottonseed meat particles must be crushed and cooked to a degree to properly coagulate proteins, coalesce the oil, promote the flow of oil from within the meats and detoxify the gossypol. In the present invention and with reference to FIGURE 1, the cottonseed is processed as usual by delinting and removing the hulls. However, prior to cooking, crushing of the cottonseed meat need not be carried out with as much compressive force as ordinarily used and meats having a flake thickness greater than normally encountered may be cooked satisfactorily. Thus eliminated at this point are elaborate crushing rollers with heavy power requirements. For example, in the present invention crushed meat particles having flake thicknesses as great as 0.025 inch are quite satisfactory.

In cooking the crushed cottonseed meat particles in cooking devices well known in the art, moisture content of the meats is controlled in the early stages of cooking so that the crushed meat contains about 14 to 16% moisture by weight. Temperature in the early stages of cooking is maintained from about 160° F. to 185° F. and is increased during the cooking operation to a temperature from about 210° F. to 230° F. in the final stage. The total cooking time preferred is 30 to 40 minutes.

In contrast with other oil extraction processes, moisture content of the crushed cottonseed meats after cooking is not allowed to decrease substantially in the present invention. After the cooking operation, 13 to 14% by weight moisture is maintained. Conventional means for breaking highly agglomerated meat particles may be used after cooking if necessary because of the high water content.

After cooking and breaking up balls or agglomerated material, the meat particles are passed between flaking rolls adjusted to compress the particle masses to a thickness of from about 0.005 to 0.008 inch. The meat particles are thus reduced to a size suitable for gravity extraction to insure proper drainage of solvent through the material and thus decrease the time required for retention of solvent in contact with the meat particles with proportionate increase in extraction capacity. Such flaking is necessary regardless of hull content of the meat particles and is a valuable step in the present invention.

After flaking, the compressed meat particles are passed to the gravity extraction means without any appreciable loss of moisture and at a temperature of approximately 155° F. Thus no special crisping equipment for reduction of moisture and temperature is necessary. Gravity flow extraction is thereby promoted by preventing fines which would impair solvent percolation.

The gravity percolation extraction means that may be used in the precent invention include vertical as well as horizontal type extractors commonly used in the art with conventional solvents such as normal hexane and methylpentane as are available commercially. Maintaining the moisture content and temperature of the meat particles as mentioned previously promotes drainage or percolation of the extracting solvent through the meat particles. The problem of "fines" is minimal which is a surprising result in view of previous practices. The overall efficiency of direct extraction on the basis of effectiveness of separation of oil from the meat particles and the extraction time required are comparable and in many cases better than heretofore encountered in the art. In addition, elaborate and cumbersome slurrying and vacuum operations are eliminated.

The following examples illustrate the valuable improvements of the present invention. The cottonseed processed was a product of the Texas South Plains area.

*Example I*

Decorticated cottonseed meats containing approximately 11% by weight hulls were crushed to about 0.022 inch particle size and adjusted to a moisture content of 15.6% by weight moisture. The crushed meats were cooked in a conventional four ring cooker having a temperature of 165° F. in the first ring and 220° F. in the fourth ring with a total cooking time of about 35 minutes. After cooking, a few agglomerated balls in the cooked meat were broken by a conventional hammer mill apparatus and the meat particles passed between flaking rolls for compression to a flake thickness of about 0.0075 inch. Moisture content of the meats after the cooking process was 14.5% by weight moisture. The compressed meat particles having a moisture content of 12.5% by weight moisture were then passed to a vertical basket type gravity percolation extractor at a temperature of approximately 155° F. whereupon the meat particles were contacted by two parts normal hexane to one part meat flakes. In actual operation, the normal hexane solvent was passed in countercurrent gravity flow in one-half of the vertical extractor to form a half-miscella which in turn was passed in concurrent gravity flow contact with the meat particles in the other half of the vertical extractor to form full miscella. A total extraction time of about 35 minutes resulted in a miscella containing 22% by weight cottonseed oil and a meal containing 0.99% by weight oil (solvent free basis) and 40% by weight solvent. The meal was then dried and solvent was removed from the miscella by conventional means. The resulting meal contained 0.05% by weight free gossypol and the residual oil contained less than 1% by weight gossypol. The crude oil refined by the A.O.C.S. official method Ca 9a–41 to a Lovibond color, 35 yellow and 4.5 red and bleached by the A.O.C.S. official method Cc 13B–45 to a Lovibond color 20 yellow and 1.5 red. The oil was stable in character and no color reversion was experienced. It will be recognized that such characteristics of the crude oil are well within ranges acceptable in the industry.

*Example II*

Under conditions otherwise similar to those in Example I, moisture content of the crushed meat particles prior to cooking was adjusted to 14.5% by weight moisture and 13% by weight moisture after cooking. After extraction, oil in the miscella was 23% by weight while residual oil in the meal was 0.86% by weight. Final oil and meal products were practically the same as in Example I.

*Example III*

Flake forming after cooking is essential in the present invention regardless of hull content of the meat. For example, a special batch of commercially pure cottonseed meats without hulls were processed as in Example II except without flake forming after cooking. In the extraction step, very little percolation of the solvent through the meat particles occurred. The miscella that was obtained contained approximately 36% by weight oil while the meal contained approximately 12.9% by weight residual oil.

*Example IV*

Again demonstrating that flake forming after the cooking process is necessary in the present invention, cottonseed meat was processed under the conditions of Example I except that the cooked meat particles were not flaked after cooking. Percolation or drainage of solvent was reduced substantially resulting in a miscella having 31% by weight oil and a meal having 6% by weight residual oil.

*Example V*

Moisture requirements for successful operation according to the present invention are critical. For example, cottonseed meat particles containing 11% hulls as in Example I were adjusted to a pre-cooked moisture content of approximately 17% by weight moisture. A resulting doughy mass could not be flaked by rolling subsequent to cooking and thus could not be processed according to the methods herein.

*Example VI*

Flake size after cooking is critical in the present invention. Cottonseed meat was processed as in Example I except that the meat particles were compressed to a flake size of 0.012 inch after cooking. Upon extraction, the miscella contained 25% by weight oil while the meal contained 2.82% by weight residual oil in contrast with the 0.99% by weight residual oil in meal in Example I.

From the foregoing results, it is apparent that certain conditions of moisture content, temperature and flake size are critical and produce avaluable results as illustrated. Thus it is seen that the present invention provides an improved method for solvent extracting oil from cottonseed which is uniquely suited to gravity flow type percolation extraction.

The present invention, therefore, is well adapted to carry out the objects and attain the ends and advantages mentioned as well as others inherent therein. While a presently preferred embodiment of the invention is given for the purpose of disclosure, numerous changes in the general process may be resorted to without departing from the spirit and scope of the invention as hereinafter claimed.

What is claimed is:

1. An improved method for directly solvent extracting oil from prepared cottonseed meats, comprising,
   mildly cooking cottonseed meat flakes having a thickness not exceeding 0.025 inch so that in the early stages of cooking the meats contain about 14 to 16% by weight moisture and in the final stages of cooking they contain about 13 to 15% by weight moisture, using an overall cooking time of from about 30 to 40 minutes, and increasing the cooking temperature from an initial temperature of from about 160° F. to 185° F. to a final temperature of from about 210° F. to 230° F.,
   compressing the cooked cottonseed meat between smooth flaking rolls to a thickness of from about 0.005 to 0.008 inch, and
   extracting the oil from the compressed meat particles by contact with an oilseed extracting solvent in gravity percolation flow.

2. The method of claim 1 wherein the compressed meat particles are passed to the extraction step without appreciable moisture loss.

3. The method of claim 1 wherein the compressed meat particles are passed to the extraction step at a temperature not exceeding 155° F.

4. The method of claim 1 wherein the compressed meat particles are passed to the extraction step without appreciable moisture loss and at a temperature not exceeding 155° F.

5. The method of claim 1 wherein the oilseed extraction solvent is normal hexane.

References Cited
UNITED STATES PATENTS

| 2,726,253 | 12/1955 | Gastrock et al. | 260—412.4 |
| 2,950,198 | 8/1960 | King et al. | 99—2 |

HENRY R. JILES, *Primary Examiner.*

A. M. TIGHE, *Assistant Examiner.*